United States Patent
Didillon et al.

(10) Patent No.: US 6,288,295 B1
(45) Date of Patent: Sep. 11, 2001

(54) CATALYST FOR USE IN ORGANIC COMPOUND TRANSFORMATION REACTIONS

(75) Inventors: Blaise Didillon, Rueil Malmaison; Denis Uzio, Marly le Roi; Elisabeth Merlen; Thierry Pages, both of Rueil Malmaison, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/143,738

(22) Filed: Aug. 28, 1998

(30) Foreign Application Priority Data

Aug. 29, 1997 (FR) .................................................. 97 10879

(51) Int. Cl.⁷ ................................ C07C 5/02; B01J 23/44
(52) U.S. Cl. .......................... 585/260; 585/259; 585/654; 502/325; 502/339
(58) Field of Search ..................................... 502/326, 337, 502/339, 325; 585/259, 260, 654

(56) References Cited

U.S. PATENT DOCUMENTS

| 4,670,416 | * | 6/1987 | Klimmek et al. . |
| 5,008,234 | * | 4/1991 | Ozin et al. . |
| 5,012,027 | * | 4/1991 | Abrevaya et al. . |
| 5,105,032 | * | 4/1992 | Holbrook et al. . |
| 5,540,833 | * | 7/1996 | Larsen et al. . |
| 5,559,071 | * | 9/1996 | Abel et al. . |
| 5,597,771 | * | 1/1997 | Hu et al. . |
| 5,707,921 | * | 1/1998 | Wu et al. . |
| 5,719,097 | * | 2/1998 | Chang et al. . |
| 5,795,840 | * | 8/1998 | Takami et al. . |
| 5,928,983 | | 7/1999 | Culross . |
| 5,958,825 | * | 9/1999 | Wulff-Doring et al. . |

FOREIGN PATENT DOCUMENTS

| 0 488 514 | | 6/1992 | (EP) . |
| 0 549 543 | | 6/1993 | (EP) . |
| 0 580 560 | | 1/1994 | (EP) . |
| 920912-A1 | * | 6/1999 | (EP) . |
| 2 707 526 | | 1/1995 | (FR) . |
| 11114419-A | * | 4/1999 | (JP) . |

* cited by examiner

Primary Examiner—Steven P. Griffin
Assistant Examiner—Christina Ildebrando
(74) Attorney, Agent, or Firm—Millen, White, Zelano & Branigan, P.C.

(57) ABSTRACT

A novel catalyst comprises at least one support and at least one metal from group VIII or the periodic table e.g. palladium and is characterized in that the metal particles deposited on the support are not isolated from each other, e.g. at least 50% of the particles have a point of contact with one other particle.

15 Claims, 4 Drawing Sheets

CATALYST FOR USE IN ORGANIC COMPOUND TRANSFORMATION REACTIONS

The present invention relates to a catalyst comprising at least one support and at least one metal from group VIII of the periodic table and characterized in that the metal particles deposited on the support are not isolated from each other.

BACKGROUND OF THE INVENTION

Supported metal catalysts are constituted by an active metal which can, for example, be a noble metal such as platinum or palladium deposited on a support in the form of particles.

The influence of particle size on catalyst activity has been widely debated in the literature for a large number of hydrocarbon transformation reactions.

For a certain number of reactions, such as hydrogenation of ethylene, propylene, cyclopentene, or benzene over supported metals such as platinum or palladium, particle size has little influence on the specific activity of the catalysts (J. C. Schlatter, M. Boudart, J. Catal. 24 (1972) 482; Y. Hadj Romdhane, B. Bellamy, V. De Gouveia, A. Masson, M. Che, Appl. Surf. Sci., 173 (1986), 383; M. Boudart, W. C. Cheng, J. Catal., 106 (1987), 134; J. M. Basset, G. Dalmai-Imelik, M. Primet, R. Martin, J. Catal., 37 (1975), 22).

The specific activity corresponds to the activity of the catalyst reduced to the number of metal atoms accessible to the molecules to be transformed. The number of accessible metal atoms can be determined by techniques involving chemisorption of probe molecules (oxygen, hydrogen, carbon monoxide) or from the particle size determined by electron microscopy. These different techniques are very well known to the skilled person.

The specific activity is also known as the turn over frequency (TOF). For such reactions and with the aim of increasing the overall activity of a catalyst for a given quantity of metal, it is important to disperse the metal on the support to the best extent, and thus to use a catalyst with the smallest possible particles.

The situation is substantially different for other reactions. As an example, for the hydrogenation of conjugated dioletins or alkynes, it has been shown that the specific activity of palladium based catalysts increases as the particle size increases. In that case, the optimum activity of the catalyst occurs when the particle size is about 4 nm (J. P. Boitiaux, J. Cosyns, S. Vasudevan, Appl. Catal., 6 (1983), 41).

SUMMARY OF THE INVENTION

The above examples show that particle size is a fundamental parameter which is a major factor in determining the activity of supported metal catalysts.

We have now discovered, and this forms the subject matter of the present invention, that when the metal particles are not deposited on the support in an isolated manner, the activity is higher than that of particles with the same size but deposited on the support in an isolated manner.

Particle aggregation is characterized by microscopic analysis of the catalyst after reducing the active phase at temperatures generally in the range 20° C. to 500° C. For the catalyst of the invention, microscopic analysis shows that at least 50% of the particles, preferably at least 70% of the particles present on the support have a point of contact with at least one other particle. The particles can equally be disposed in the form of clusters, agglomerates, strings or in any other configuration in which preferably at least 50% of the particles, and in more preferred way at least 70% of the particles have at least one point of contact with at least one other particle. In other words, the proportion of isolated particles is preferably less than 50%, in a more preferred way less than 30%.

BRIEF DESCRIPTION OF THE DRAWINGS

To illustrate the invention, some representative photographs of the catalysts of the invention accompany this description.

In FIG. 1, the scale is 1.5 cm=20 nm: in FIG. 2, 1 cm=10 nm; and FIGS. 3 and 4, 2.5 cm=50 mn.

Figure 1:
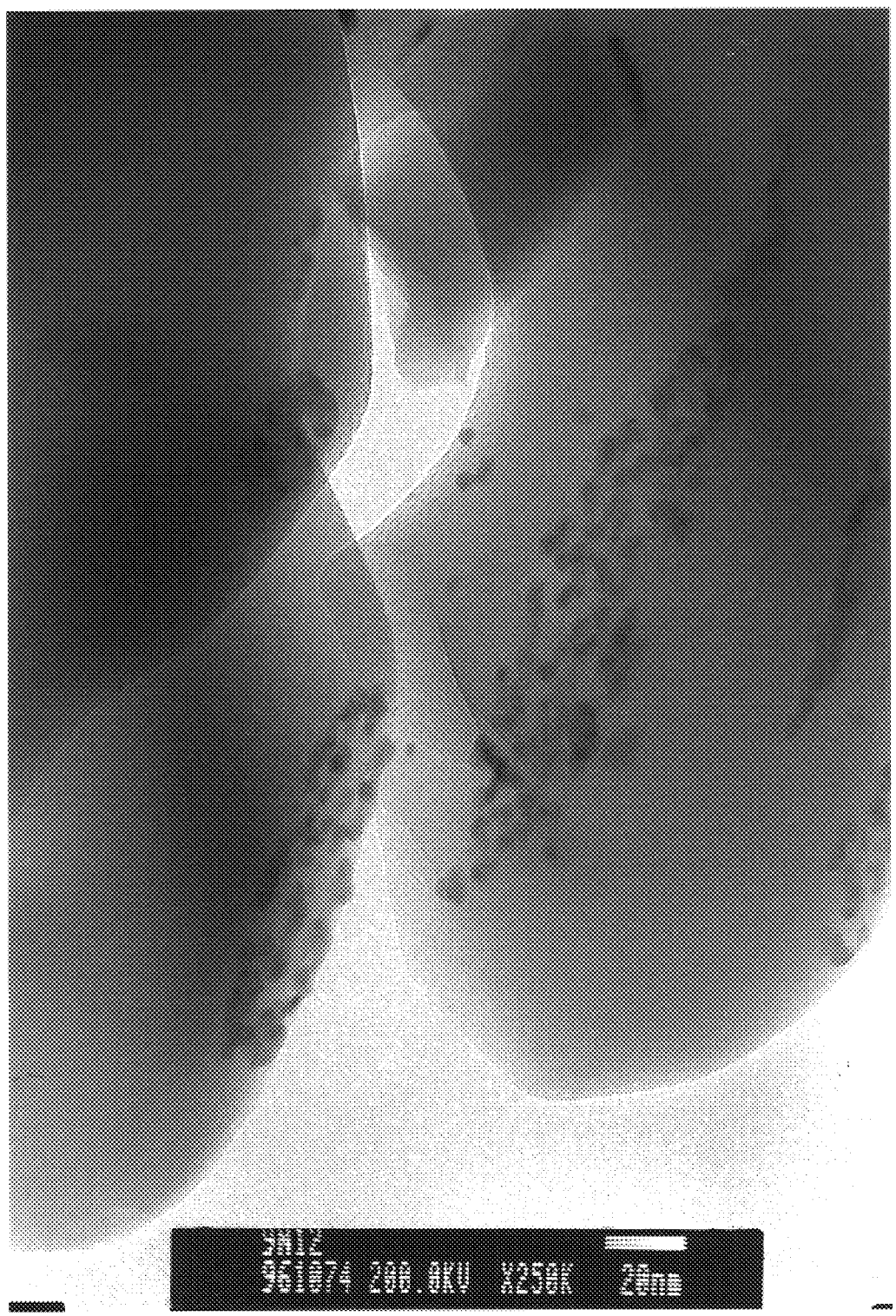
FIGS. 1, 2 and 4 show particle aggregates of various forms.
Figure 2:
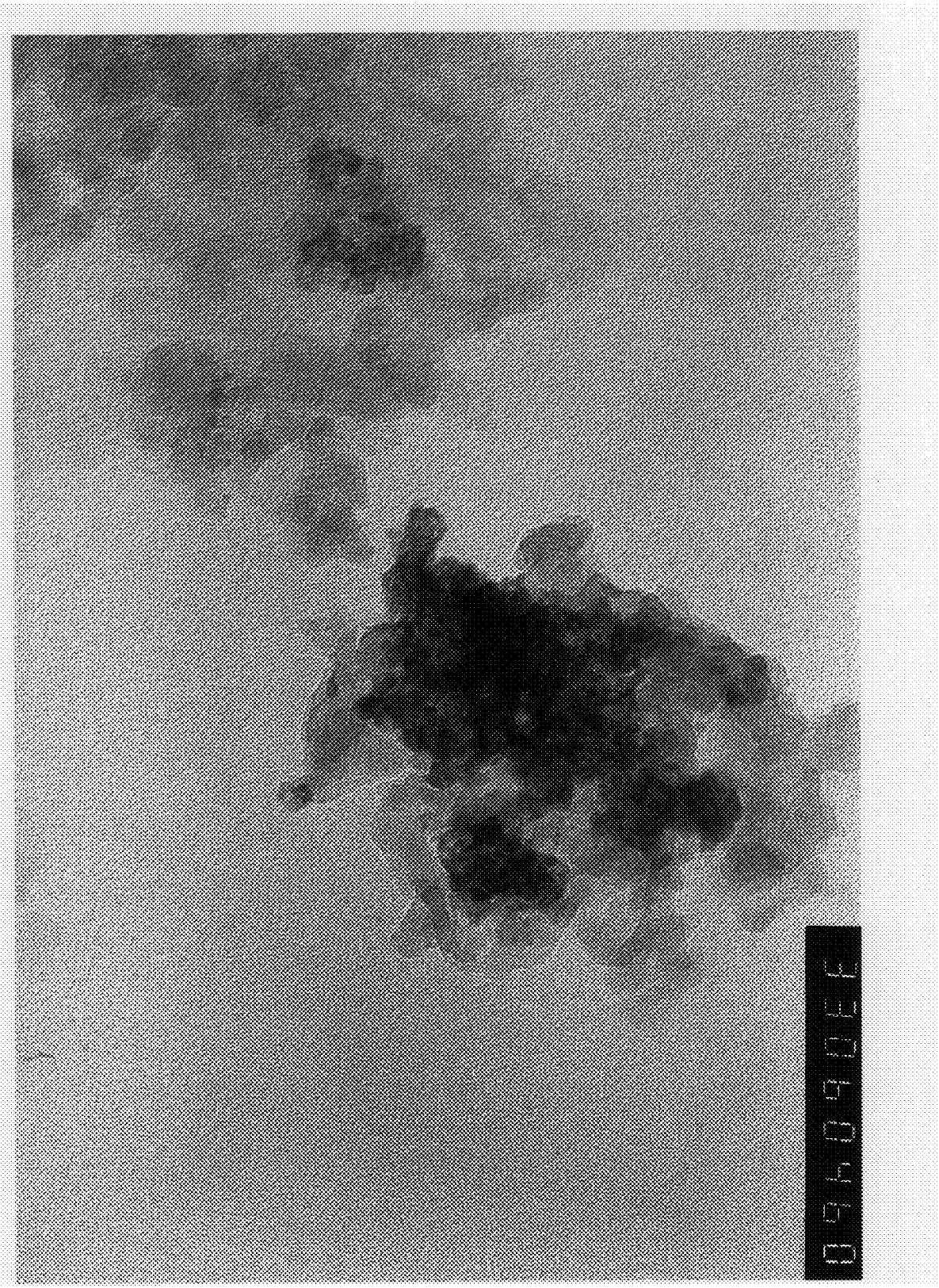
Figure 3:
FIG. 3 is given by way of comparison and shows isolated particles.
Figure 4:
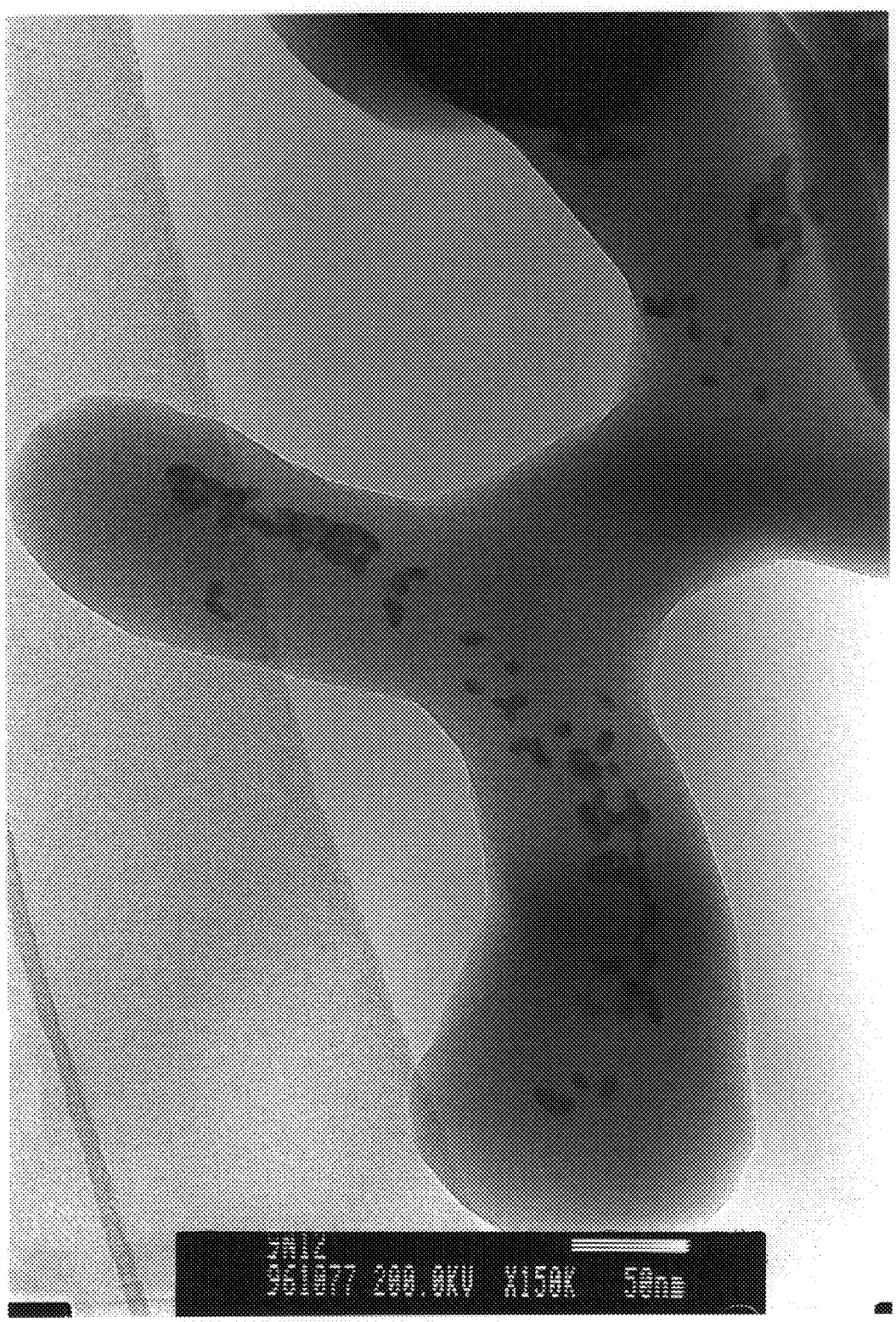

More particularly, the catalysts of the present invention are applicable to processes for hydrogenation of compounds containing acetylene, olefin, ketone, aldehyde, acid, or nitro functions, in particular to processes for purifying olefin cuts by selective hydrogenation. The conditions generally used for this type of transformation are a temperature in the range 25° C. to 250° C., a pressure in the range 0.1 to 10 MPa and a hydrogen to feed ratio (vol/vol) in the range 1 to 150. The feed is generally a cut from a cracking process containing 2 to 12 carbon atoms. This can also be a feed from an ethylbenzene dehydrogenation process for producing styrene. In that case, phenylacetylene must be eliminated. The space velocities are generally in the range 0.1 to 50 $h^{-1}$ when treating liquid feeds and 500 to 30,000 $h^{-1}$ when treating gaseous feeds.

The support for the catalyst of the invention comprises at least one refractory oxide, generally selected from oxides of magnesium, aluminium, silicon, zirconium, and thorium, used alone or as a mixture, or with oxides of other elements from the periodic table. Carbon, silico-aluminates, clays or any other compound which can act as a support can also be used. This support can be used in the form of a powder or after forming; any forming technique is suitable.

The catalyst of the invention also comprises a metal from group VIII of the periodic table of the elements. This metal is preferably platinum, palladium or nickel when the catalyst is intended for transforming acetylenic or dienic compounds. Ruthenium and rhodium can be added to this list when the catalyst is intended to transform organic functions containing a heteroatom, such as oxygen or nitrogen.

The metal is introduced so as to obtain particles dispersed on a support such that at least 50% of the particles, preferably at least 70% of the particles, have at least one point of contact between them.

One particularly suitable preparation technique is impregnation with a solution containing particles of the oxide or metal to be deposited in suspension; the solvent can be water or an organic solvent. In order to increase the points of contact between the particles, the solution can contain a limited concentration of a complexing agent to stabilise the solution. The complexing agent is not indispensable, however.

A further preparation technique consists of impregnation with an aqueous solution of a precursor of the metal to be deposited, the characteristics of this solution (pH, ionic strength, salt concentration) enabling the limit of stability of the metallic precursor to be reached. Examples are aqueous salt solutions such as hexahydroxyplatinic acid and palladium nitrate. These examples are not limiting and in no way limit the invention.

After depositing the catalytic element or elements by impregnation with solutions, the catalyst is generally dried at 120° C., optionally calcined at temperatures generally in the range 120° C. to 500° C. and reduced at temperatures generally in the range from ambient temperature to 500° C.

The amount of group VIII metal in the catalyst of the invention is generally in the range 0.01% to 50% by weight. This amount depends on the envisaged application.

The catalyst can also contain other elements such as an alkali metal, an alkaline-earth metal, or a metalloid such as sulphur.

The complete description of all applications, patents and publications cited above and below and the corresponding French application 97/10879 filed on Aug. 29, 1997 is hereby included in the present description by reference.

The following examples illustrate the invention without in any way limiting its scope.

EXAMPLE 1 (comparative)

A catalyst A was prepared from an alumina with a specific surface area of 9 $m^2/g$ and a pore volume of 0.6 ml/g. This support was in the form of 3 mm diameter beads. The support was impregnated with a solution of palladium bis-acetylacetonate diluted in toluene. After impregnation, the support was dried then calcined at 300° C and reduced at 750° C.

The final palladium content was 0.3% by weight. Microscopic analysis of this catalyst showed that the average particle size was 6.5 nm. These particles were isolated on the support. The catalyst was thus not in accordance with the invention. The proportion of palladium accessible to molecules was measured by CO chemisorption at ambient temperature. This proportion was 18%.

EXAMPLE 2

A catalyst B was prepared from the support described in Example 1. This support was impregnated using a palladium nitrate solution with a pH of 1.8. The volume of solution used was 0.6 ml per gram of support to be impregnated.

After impregnation, the catalyst was dried at 120° C. and calcined at 450° C. then reduced at 150° C.

The final catalyst contained 0.3% by weight of palladium.

Electron microscope analysis of catalyst B showed that the average diameter of the palladium particles was 6.5 nm. For this catalyst, the particles exhibited points of contact with each other. Only 15% of the particles are isolated on the support. Catalyst B was thus in accordance with the invention.

The proportion of palladium accessible to molecules was measured by CO chemisorption at ambient temperature. This proportion was 16%.

EXAMPLE 3 (comparative)

A catalyst C was prepared using the conditions of Example 2 but using a solution of palladium nitrate diluted in nitric acid, pH 0.8.

The final catalyst contained 0.3% by weight of palladium.

Microscopic analysis of this catalyst showed that the average diameter of the palladium particles was 2.0 nm. These particles were isolated on the support. Thus the catalyst was not in accordance with the invention. The proportion of palladium accessible to molecules was measured by CO chemisorption at ambient temperature. This proportion was 50%.

EXAMPLE 4

A catalyst D was prepared using the conditions of Example 3 but in this case, the specific surface area of the support was 40 $m^2/g$.

Electron microscope analysis of this catalyst showed that the average diameter of the palladium particles was 2.0 nm. For this catalyst, the particles exhibited contact points between each other. Only 20% of the particles are isolated on the support. Catalyst D was thus in accordance with the invention.

The proportion of palladium accessible to molecules was measured by CO chemisorption at ambient temperature. This proportion was 20%.

EXAMPLE 5 (comparative)

A catalyst E was prepared using the conditions of Example 4 except that the catalyst reduction temperature was raised to 600° C. instead of 150° C.

Electron microscope analysis of this catalyst showed that the average diameter of the palladium particles was 5.0 nm. For this catalyst, the particles were isolated on the support. Thus catalyst E was not in accordance with the invention.

The proportion of palladium accessible to molecules was measured by CO chemisorption at ambient temperature. This proportion was 18%.

EXAMPLE 6

The different catalysts prepared in Examples 1 to 5 underwent a test for hydrogenation of an acetylenic compound in a perfectly stirred batch reactor under the following operating conditions:

Catalyst: 1.5 g;

Hydrogen pressure: 1 MPa

Temperature: 17° C.;

Volume of phenylacetylene: 13 ml;

Volume of n-heptane: 180 ml.

Analysis of periodically removed liquid samples enabled the activity of the catalyst to be determined under the above experimental conditions. The results shown in Table 1 are expressed in moles of phenylacetylene converted per minute per gram of catalyst.

The specific activity as defined in the present description corresponded to the activity of the catalyst reduced to the quantity of palladium accessible to molecules.

TABLE 1

| Catalyst | % accessible metal | Particle size (nm) | Hydrogenating activity (moles $min^{-1}$ g $cat^{-1}$) | Specific activity (moles $min^{-1}$ at $Pd^{-1}$) |
|---|---|---|---|---|
| A (comparative) | 18 | 6.5 | $5.0 \times 10^{-4}$ | 2 |
| B (invention) | 16 | 6.5 | $5.7 \times 10^{-3}$ | 21 |
| C (comparative) | 50 | 2.0 | $2.5 \times 10^{-3}$ | 3 |
| D (invention) | 20 | 2.0 | $5.1 \times 10^{-3}$ | 15 |
| E (comparative) | 18 | 5.0 | $2.2 \times 10^{-3}$ | 7 |

These results show that, independently of the percentage of accessible palladium and the particle size, the hydrogenating activity and specific activity of the catalysts of the invention are at least twice as high as that of the comparative catalysts.

The above examples can be repeated with analogous results by substituting the general or particular reactants and/or conditions described in the invention for those used in the examples.

The above description will enable the skilled person to readily determine the essential characteristics of the invention and to make a variety of changes or modifications to adapt it to a variety of uses and conditions without departing from the spirit and scope of the invention.

What is claimed is:

1. In a catalyst comprising at least one support and at least one metal from group VIII of the periodic table of the elements deposited on said support, the improvement wherein at least 50% of the particles of said at least one group VIII metal have a point of contact with at least one other group VIII metal particle, said particles having an average size of 2–6.5nm, wherein said at least one metal from group VIII of the periodic table is palladium.

2. A catalyst according to claim 1, wherein at least 70% of the palladium particles present on the support have a point of contact with at least one other palladium particle.

3. A catalyst according to claim 1, wherein at least 80% of the palladium particles present on the support have a point of contact with at least one other palladium particle.

4. A catalyst according to claim 1, wherein at least 85% of the palladium particles present on the support have a point of contact with at least one other palladium particle.

5. A catalyst according to claim 1, wherein the support comprises at least one oxide of magnesium, aluminum, silicon, zirconium, and thorium, used alone or as a mixture, or with oxides of other elements from the periodic table, carbon, silico-aluminates, or a clay.

6. A catalyst according to claim 1, wherein the amount of palladium therein is in the range 0.01% to 50% by weight.

7. A catalyst according to claim 1, wherein the support has a specific surface area of 9 to 40 mug.

8. A catalyst according to claim 1, wherein said catalyst consists essentially of said support and said palladium particles.

9. In a process comprising selectively hydrogenating an acetylenic compound in an olefin cut, in the presence of a catalyst, under selective hydrogenation conditions, the improvement wherein said catalyst is in accordance with claim 1.

10. A process according to claim 9, wherein said acetylenic compound is acetylene.

11. A process according to claim 9, wherein said acetylenic compound is phenyl acetylene.

12. In a process comprising selectively hydrogenating an acetylenic compound in an olefin cut, in the presence of a catalyst, the improvement wherein said catalyst is in accordance with claim 1 and the process is conducted at a temperature in the range 25° to 250° C., at a pressure in the range 0.1 to MPa and with a ratio of hydrogen to feed (vol/vol) in the range 1 to 150.

13. A process according to claim 12, wherein said process is conducted with space velocities in the range of 0.1 to 50 $h^{-1}$ when treating liquid feeds and of 500 to 30,000 $h^{-1}$ when treating gaseous feeds.

14. A process according to claim 12, wherein said acetylenic compound is acetylene.

15. A process according to claim 12, wherein said acetylenic compound is phenyl acetylene.

\* \* \* \* \*

UNITED STATES PATENT AND TRADEMARK OFFICE
CERTIFICATE OF CORRECTION

PATENT NO. : 6,288,295 B1
DATED : September 11, 2001
INVENTOR(S) : Didillon et al.

It is certified that error appears in the above-identified patent and that said Letters Patent is hereby corrected as shown below:

<u>Column 6,</u>
Line 4, reads "40 mug" should read -- 40 $m^2/g$ --
Line 22, reads "range 0.1 to MPa" should read -- range 0.1 to 10 MPa --

Signed and Sealed this

Third Day of December, 2002

JAMES E. ROGAN
*Director of the United States Patent and Trademark Office*